US010086696B2

(12) United States Patent
Park et al.

(10) Patent No.: US 10,086,696 B2
(45) Date of Patent: Oct. 2, 2018

(54) AGRICULTURAL WORKING VEHICLE TRANSMISSION COMBINATION

(71) Applicant: DAEDONG INDUSTRIAL CO., LTD., Daegu (KR)

(72) Inventors: Dong Wook Park, Changnyeong-gun (KR); Ki Sung Shin, Changnyeong-gun (KR)

(73) Assignee: DAEDONG INDUSTRIAL CO., LTD., Daegu (KR)

( * ) Notice: Subject to any disclaimer, the term of this patent is extended or adjusted under 35 U.S.C. 154(b) by 39 days.

(21) Appl. No.: 15/112,750

(22) PCT Filed: May 28, 2015

(86) PCT No.: PCT/KR2015/005353
§ 371 (c)(1),
(2) Date: Jul. 20, 2016

(87) PCT Pub. No.: WO2015/183009
PCT Pub. Date: Dec. 3, 2015

(65) Prior Publication Data
US 2017/0087983 A1    Mar. 30, 2017

(30) Foreign Application Priority Data

May 29, 2014    (KR) ........................ 10-2014-0065130

(51) Int. Cl.
*B60K 17/28*    (2006.01)
*B60K 17/06*    (2006.01)
(Continued)

(52) U.S. Cl.
CPC .............. *B60K 17/28* (2013.01); *B60K 17/06* (2013.01); *B60K 25/06* (2013.01); *F16H 3/091* (2013.01);
(Continued)

(58) Field of Classification Search
CPC ........ B60K 17/28; B60K 17/06; B60K 25/06; F16H 3/091
See application file for complete search history.

(56) References Cited

U.S. PATENT DOCUMENTS 2,970,482 A * 2/1961 Strehlow ................ B60K 17/28
74/15.84
5,970,809 A * 10/1999 Nam ...................... B60K 17/28
74/15.4
(Continued)

FOREIGN PATENT DOCUMENTS

JP    11-078560 A    3/1999
JP    2009-208552 A    9/2009
(Continued)

OTHER PUBLICATIONS

Search Report for International Application No. PCT/KR2015/005353.

*Primary Examiner* — Faye M Fleming
(74) *Attorney, Agent, or Firm* — LRK Patent Law Firm

(57) ABSTRACT

An agricultural working vehicle transmission combination includes: a clutch housing having a flywheel housing integrally formed thereon so as to cover an engine flywheel and a hollow transmission case directly connected to the rear side of the clutch housing. The clutch housing includes a PTO clutch unit for connecting/disconnecting transfer of engine power to a PTO shaft, a main gear-shifting unit for primary gear-shifting of engine power, and a bi-speed turn unit for front-wheel bi-speed turn execution. The transmission case includes a forward/backward gear-shifting unit connected to the rear side of the main gear-shifting unit via an intermediate clutch such that power can be transferred and a sub gear-shifting unit for secondary gear-shifting behind the forward/backward gear-shifting unit.

20 Claims, 8 Drawing Sheets

(51) Int. Cl.
  *B60K 25/06*   (2006.01)
  *F16H 3/091*   (2006.01)
  *F16H 57/02*   (2012.01)
  *F16H 3/08*    (2006.01)
  *F16H 37/04*   (2006.01)

(52) U.S. Cl.
  CPC .......... *F16H 57/02* (2013.01); *B60Y 2200/22* (2013.01); *B60Y 2200/221* (2013.01); *F16H 37/043* (2013.01); *F16H 2003/0822* (2013.01)

(56) References Cited

U.S. PATENT DOCUMENTS

| | | | |
|---|---|---|---|
| 7,163,077 B2* | 1/2007 | Hasegawa | B60K 17/105 180/292 |
| 9,874,271 B2* | 1/2018 | Hughes | F16H 47/06 |
| 2004/0182632 A1* | 9/2004 | Hasegawa | B60K 17/105 180/307 |
| 2012/0042743 A1* | 2/2012 | Hunold | B60K 17/28 74/335 |
| 2013/0146412 A1* | 6/2013 | Takeshima | F16H 45/02 192/3.29 |
| 2017/0138410 A1* | 5/2017 | Filsinger | F16D 13/385 |

FOREIGN PATENT DOCUMENTS

| KR | 10-2009-0081240 A | 7/2009 |
|---|---|---|
| KR | 10-2010-0051250 A | 5/2010 |
| KR | 10-0988155 B1 | 10/2010 |
| KR | 10-2014-0026820 A | 3/2014 |

\* cited by examiner section taken along line A-A section taken along line B-B

AGRICULTURAL WORKING VEHICLE TRANSMISSION COMBINATION

TECHNICAL FIELD

The present invention relates to a transmission assembly for an agricultural work vehicle, and more particularly, to a transmission assembly for an agricultural work vehicle that is adapted to change the power generated from an engine to a torque needed for driving or working and to transmit the torque.

BACKGROUND ART

An agricultural work vehicle which is called 'tractor' is structurally similar to general cars, but it has a powerful engine so that it has good traction force and is strong. As a result, the tractor is generally used for cultivation in agricultural work, and so as to perform the cultivation, further, the tractor has various kinds of agricultural work machines detachable attached to the rear side of the body thereof.

So as to improve the efficiencies of the work, the agricultural work vehicle has to have a large gear-shifting range so that a driving speed and a rotational speed of a power take off (which is referred to as 'PTO') shaft can be adjusted to optimal speeds according to qualities of soil under the work, and accordingly, the agricultural work vehicle adopts a transmission complicated in structure and having a large gear-shifting range.

FIG. 1 is a sectional view showing a conventional transmission assembly for an agricultural work vehicle.

Referring to FIG. 1, a conventional transmission assembly for an agricultural work vehicle largely includes a transmissions 1 and a rear differential 6. The transmission 1 includes a shuttle gear-shifting unit 2 for forward/backward gear-shifting, a main gear-shifting unit 3 and a sub gear-shifting unit 4 fox providing a large gear-shifting step range, and a front wheel driving unit 5 for performing bi-speed turn and front wheel driving, and the rear differential 6 is adapted to appropriately distribute the power gear-shifted by the transmission 1 to left and right rear wheels.

The shuttle gear-shifting unit 2 of the transmission 1 is a hydraulic multi-plate clutch for performing selective power connection by the pressure oil whose flowing is permitted by the lever manipulation of a driver, and the main gear-shifting unit 3 has a synchronized multi-stepped (four seep) gear. The sub gear-shifting unit 4 has pairs of gears having different gear ratios moving to left and right sides by means of lever manipulation in such a manner as to be selectively engaged with each other.

The front wheel driving unit 5 is a hydraulic multi-plate clutch in the same manner as the shuttle gear-shifting unit 2. The various components constituting the transmission 1 and the rear differential 6 are located protectedly in a closed space formed by a transmission ease 8, and oil as a lubricating agent is filled in the transmission case 8 so as to achieve gentle power transmission between gears, gentle shaft rotation, and friction and abrasion reduction between components.

A reference numeral 7 nor explained yet in the figure indicates a PTO gear-shifting unit for taking off the engine power from the vehicle body so that the power generated from the engine is utilized as the power for driving the work vehicle.

However, the conventional transmission assembly for the agricultural work vehicle is complicated in structure, thereby causing high manufacturing costs and low assemblability and productivity, and is bulky in whole volume, so that if it is applied to a small-sized agricultural work vehicle having small wheel sizes, it is hard to ensure ground clearance or to provide a low-floor vehicle with a driver's seat having a low height.

DISCLOSURE

Technical Problem

Accordingly, the present invention has been made in view of the above-mentioned problems occurring in the prior art, and it is an object of the present invention to provide a transmission assembly for an agricultural work vehicle that is capable of advantageously ensuring ground clearance or providing a low-floor vehicle with a driver's seat having a low height.

Technical Solution

To accomplish the above-mentioned object, according to the present invention, there is provided a transmission assembly for an agricultural work vehicle, including: a PTO power line located coaxially with an input shaft disconnectably connected to an engine flywheel via a main clutch so as to transmit engine power to the outside; and a driving power line branched from the input shaft and located biaxially with the PTO power line.

According to the present invention, desirably, the PTO power line comprises a PTO shaft located coaxially with the input shaft: and a PTO reduction unit for reducing the rotational speed of the PTO shaft to a given speed adequate for working, and the driving power line comprises: a main gear-shifting unit for performing first gear-shifting of the engine power transmitted from the input shaft; a forward/backward gear-shifting unit for performing forward and backward conversion; a sub gear-shifting unit for performing second gear-shifting of the power whose rotational direction is determined after the first gear-shifting; and a bi-speed turn unit for performing front wheel speed-increasing.

According to the present invention, desirably, the transmission assembly for an agricultural work vehicle further includes: a clutch housing formed unitarily with a flywheel housing adapted to cover the engine flywheel; and a hollow transmission case connected directly to the rear side of the clutch housing, wherein the clutch housing has, in the interior thereof, a PTO clutch unit for controlling the transmission of the engine power to the PTO shaft, the main gear-shifting unit for performing first gear-shifting of the engine power, and the bi-speed turn unit for performing the bi-speed turn of front wheels, and the transmission case has, in the interior thereof, the forward/backward gear-shifting unit located behind the main gear-shifting unit and the sub gear-shifting unit located behind the forward/backward gear-shifting: unit so as to perform the second gear-shifting.

According to the present invention, desirably, the clutch housing has a partitioning wall formed unitarily therewith in such a manner as to be located between a portion for covering the engine flywheel and a portion for accommodating the main gear-shifting unit thereinto, the partitioning wall being formed unitarily with a hollow input shaft support tube.

According to the present invention, desirably, the input shaft, which is disconnectably connected to the engine flywheel via the main clutch and at the same time is disconnectably connected to the PTO shaft via the PTO clutch unit, is fitted to the input shaft support tube.

According to the present invention, desirably, the PTO clutch unit is a hydraulic multi-plate clutch.

According to the present invention, desirably, the main gear-shifting unit includes: a hollow gear shaft fitted to the outer periphery of the input shaft in front of the PTO shaft; a main gear-shifting gear shaft engaged with the hollow gear shaft and having gears with different sizes; a main gear-shifting output shaft having gears engaged correspondingly to the gears of the main gear-shifting gear shaft; and main gear-shifting shifters disposed between the gears of the main gear-shifting output shaft to select gear-shifting steps.

According to the present invention, desirably, the main gear-shifting gear shaft is disposed in parallel with the side periphery of the PTO shaft, and the main gear-shifting output shaft is located under the main gear-shifting gear shaft.

According to the present invention, desirably, the transmission assembly for an agricultural work vehicle further includes a hydraulic multi-plate clutch type intermediate clutch located between the main gear-shifting unit and the forward/backward gear-shifting unit.

According to the present invention, desirably, the forward/backward gear-shifting unit includes: a forward/backward shuttle shaft located coaxially with the output side shaft of the main gear-shifting unit; an idle gear shaft located in parallel with the forward/backward shuttle shaft; and a forward/backward output shaft located in parallel with the forward/backward shuttle shaft and the idle gear shaft in such a manner as to rotate with the power transmitted directly from the forward/backward shuttle shaft or with the power bypassing the idle gear shaft.

According to the present invention, desirably, the forward/backward shuttle shaft has a forward gear, a backward gear, and a forward/backward shifter moving between the forward gear and the backward gear fitted thereto, the forward/backward output shaft has a backward driven gear engaged with the backward gear and a forward driven gear engaged with the forward gear fitted thereto, and the idle gear shaft has an idle gear fitted unitarily thereto to power-transmittably connect the forward gear with the forward driven gear.

According to the present invention, desirably, the forward/backward output shaft is isolatedly located on the side periphery of the forward/backward shuttle shaft in parallel with the forward/backward shuttle shaft, and the idle gear shaft is located above the right side periphery of the forward/backward shuttle shaft between the forward/backward shuttle shaft and the forward/backward output shaft in parallel with the two shafts.

According to the present invention, desirably, the sub gear-shifting unit includes: a sub gear-shifting gear shaft connected to the output side shaft of the forward/backward gear-shifting unit and having a plurality of gears having different diameters from each other; a pinion shaft having gears engaged correspondingly to the gears of the sub gear-shifting gear shaft to output the final gear-shifted power whose rotational speed and direction are determined to a rear axle side; and sub gear-shifting shifters located between the gears of the pinion shaft so as to select sub gear-shifting steps.

According to the present invention, desirably, the sub gear-shifting gear shaft is located on the same line as the output side shaft of the forward/backward gear-shifting unit, and the pinion shaft is located on the center of the transmission case on the side periphery of the sub gear-shifting gear shaft in parallel with the sub gear-shifting gear shaft.

According to the present invention, desirably, the bi-speed turn unit, includes: a bi-speed turn clutch having a pair of front and back hydraulic multi-plate clutches; a transmission shaft for power-transmittably connecting the bi-speed turn clutch to the output aide shaft of the sub gear-shifting unit outputting the final gear-shifted power whose rotational speed and direction are determined; and a front wheel drive shaft for transmitting, the gear-shifted power or the power not gear-shifted, which is determined through the selective connection to the bi-speed turn clutch, to a front axle.

According to the present invention, desirably, the transmission shaft is extended toward the clutch housing along the bottom of the transmission case under the sub gear-shifting unit on the rear side of the transmission case, and the bi-speed turn clutch is located in the spare space under the main gear-shifting unit of the clutch housing.

According to the present invention, desirably, the transmission assembly for an agricultural work vehicle further includes; a PTO reduction unit located on the rear end periphery of the PTO shaft; and an end plate located on the rear end of the transmission case to cover the PTO reduction unit.

According to the present invention, desirably, the PTO reduction unit includes: a PTO gear shaft connected directly to the PTO shaft and having two or more gears having different diameters from each other; a PTO output shaft having two or more gears engaged with the two or more gears of the PTO gear shaft; and a PTO gear-shifting shifter located between the gears of the pinion shaft to select gear-shifting steps.

Advantageous Effects

According to the present invention, the transmission assembly for an agricultural work vehicle is configured wherein the flywheel housing covering the engine flywheel is formed unitarily with the clutch housing and the spare space in the housings and the case is effectively utilized to allow the respective units to fee efficiently located therein, thereby satisfying the demand in the market for a large gear-shifting range and achieving both of miniaturization and compactness of the product.

As the miniaturization and compactness of the product are achieved, additionally, the transmission assembly for an agricultural work vehicle according to the present invention has more advantageous effects than the conventional transmission assemblies in view of the manufacturing cost and assemblability and productivity, and if it is applied to a low-specification small-sized agricultural work vehicle having small wheel sizes, advantageously, it ensures ground clearance and provides a low-floor vehicle with a driver's seat having a low height.

BEST MODE FOR INVENTION

Hereinafter, an explanation on a transmission assembly for an agricultural, work vehicle according to the present invention will be in detail given with reference to the attached drawing. In the description, if it is determined that the detailed explanation on the well known technology related to the present invention, makes the scope of the present invention not clear, the explanation will be avoided for the brevity of the description.

Figure 1:
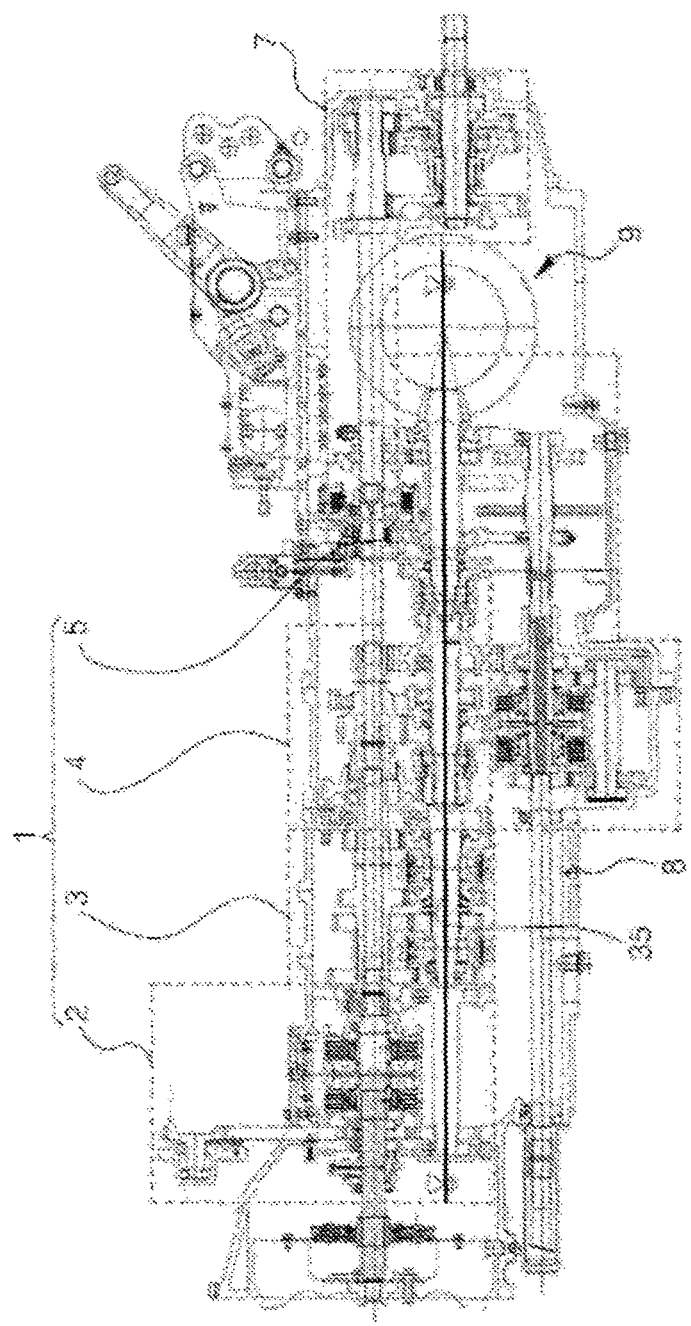
FIG. 1 is a sectional view showing a conventional transmission assembly for an agricultural work vehicle.
Figure 2:
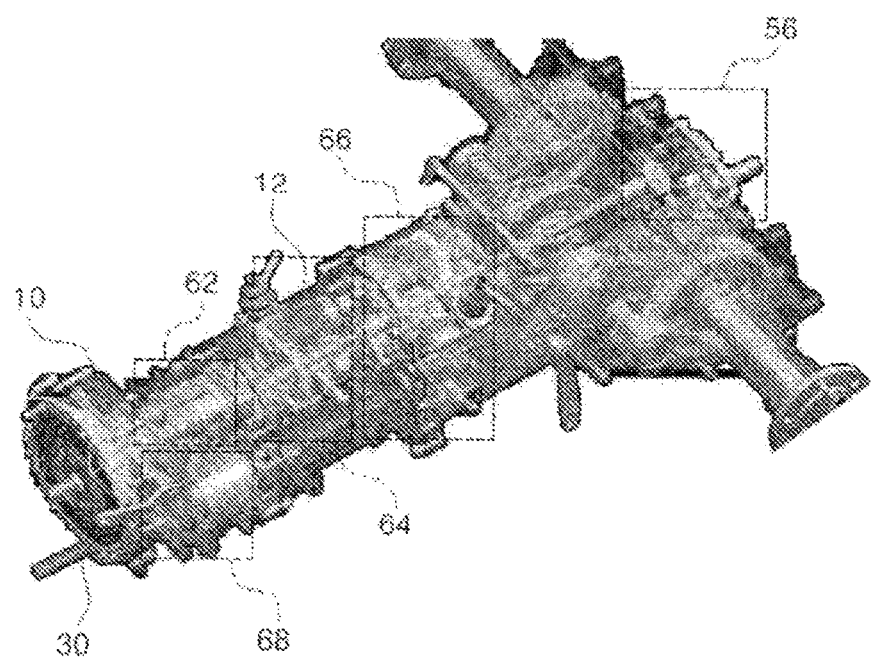
FIG. 2 is a perspective view showing a transmission assembly for an agricultural work vehicle according to the present invention.
Figure 3:
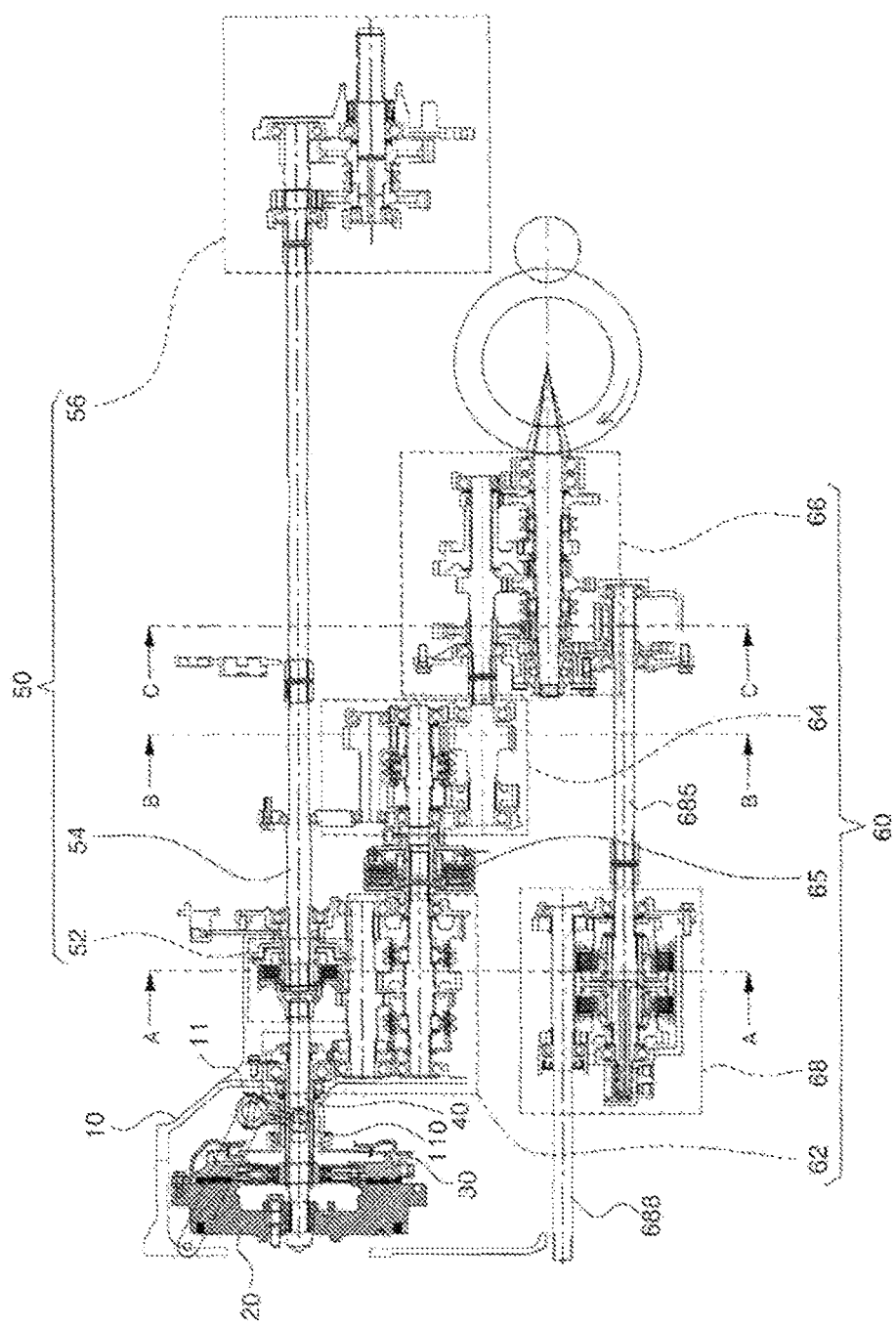
FIG. 3 is a development view showing the transmission assembly for an agricultural work vehicle according to the present invention.

FIG. 2 is a perspective view showing a transmission assembly for an agricultural work vehicle according to the present invention, and FIG. 3 is a development view showing the transmission assembly for an agricultural work vehicle according to the present invention. First, the whole configuration of a transmission assembly for an agricultural work vehicle according to the present invention will be described with reference to FIGS. 2 and 3.

In the description, all of gears, which are rotated unitarily with shafts and rotated freely therefrom, are indicated by a reference symbol 'g' for the conveniences of the description end the simplification of the reference numerals in the drawing.

Referring to FIGS. 2 and 3, the transmission assembly for an agricultural work vehicle according to the present invention largely includes: a PTO power line 50 located coaxially with an input shaft 40 disconnectably connected to an engine flywheel 20 via a main clutch 30 so as to take off engine power to the outside; and a driving power line 60 branched from the input shaft 40 and located biaxially with the PTO power line 50.

The PTO power line 50 includes a PTO shaft 54 located coaxially with the input shaft 40 and a PTO reduction, unit 56 for reducing the rotational speed of the PTO shaft 54 to a given speed adequate for working, and the driving power line 60 includes a main gear-shifting unit 62, a forward/backward gear-shifting unit 64, a sub gear-shifting unit 66 and a bi-speed turn unit 68, which are adapted to change the engine power transmitted from the input shaft 40 to a torque adequate for driving or working.

In more detail, the transmission assembly for an agricultural work vehicle according to the present invention, which is a device for changing the engine power generated from an engine to a torque needed for driving or working, has an outer shape with a clutch housing 10 formed unitarily with a flywheel housing adapted to cover the engine flywheel 20 and a hollow transmission case 12 connected directly to the rear side of the clutch housing 10.

The clutch housing 10 includes, in the interior thereof, a PTO clutch unit 52 for controlling the transmission of the engine power to the PTO shaft 54, the main gear-shifting unit 62 for performing first gear-shifting of the engine power, and the bi-speed turn unit 68 for performing the bi-speed turn of front wheels, and the transmission case 12 includes, in the interior thereof the forward/backward gear-shifting unit 64 located behind the main gear-shifting unit 62 and the sub gear-shifting unit 66 located behind the forward/backward gear-shifting unit 64 so as to perform second gear-shifting.

The PTO shaft 54 is located coaxially with an engine output shaft (not shown) and rotates with the engine output not gear-shifted. The main gear-shifting unit 62 receives the power branched front the PTO power line 50 and performs the first gear-shifting of the power generated from the engine to power having a rotational speed adequate for driving or working. The first gear-shifted power is supplied to the forward/backward gear-shifting unit 64 at which the direction of rotation is determined, and next, the power is transmitted to the sub gear-shifting unit 66.

Through the sub gear-shifting unit 66, the power with the first gear-shifting by the main gear-shifting unit 62 and with the direction of rotation determined by the forward/backward gear-shifting unit 64 is gear-shifted again to the power having the rotational speed adequate for driving or working. The power whose rotation direction and speed are finally determined through the second gear-shifting is supplied to a rear axle via the sub gear-shifting unit 66, so that the power is used as driving power for driving a vehicle.

The bi-speed turn unit 68 is connected to the sub gear-shifting unit 66 in such a manner as to receive the power from the sub gear-shifting unit 66. Accordingly, if a four-wheel drive mode is selected by the manipulation of a driver, the bi-speed turn unit 68 receives the sub gear-shifted power whose rotation direction and speed are finally determined and thus performs additional gear-shifting (when the four-wheel drive mode having a bi-speed turn function is carried out) or transmits the received power to front wheels, without having the additional gear-shifting (in case of just four-wheel drive mode).

The clutch housing 10 has a partitioning wall 11 formed unitarily therewith in such a manner as to be located between a portion for covering the engine flywheel 20 and a portion for accommodating the main gear-shifting unit 62 thereinto, and the partitioning wall 11 is formed unitarily with a hollow input shaft support tube 110. As a result, the input shaft 40, which is disconnectably connected to the engine flywheel 20 via the main clutch 30, is freely rotatably fitted to the input shaft support tube 110, and the opposite end portion of the input shaft 40 to the end portion fitted to the input shaft support tube 110 is connected to the PTO shaft 54.

The PTO clutch unit 52 is located between the input shaft 40 and the PTO shaft 54. The connection of power of the PTO shaft 54 to the input shaft 40 is controlled by means of the PTO clutch unit 52. That is, if the PTO clutch unit 52 operates in a power connection direction, the engine power is transmitted to the power line of the PTO shaft 54 through the input shaft 40, but contrarily, if the PTO clutch unit 52 operates in a power connection releasing direction, the PTO shaft 54 does not rotate.

As shown in FIG. 3, the PTO reduction unit 56 is located at the rear end of the PTO shaft 54 and shifts the engine power not gear-shifted to the power adequate for working environments or conditions to transmit the shifted power to a work vehicle connected to the rear side thereof. As shown in FIGS. 2 and 3, a reference numeral 14 indicates an end plate located on the rear side of the transmission case 12 to support a shaft constituting the PTO reduction unit 56.

Now, an explanation on the respective units of the transmission assembly for an agricultural work vehicle according to the present invention will be in more detail given.

Figure 4:
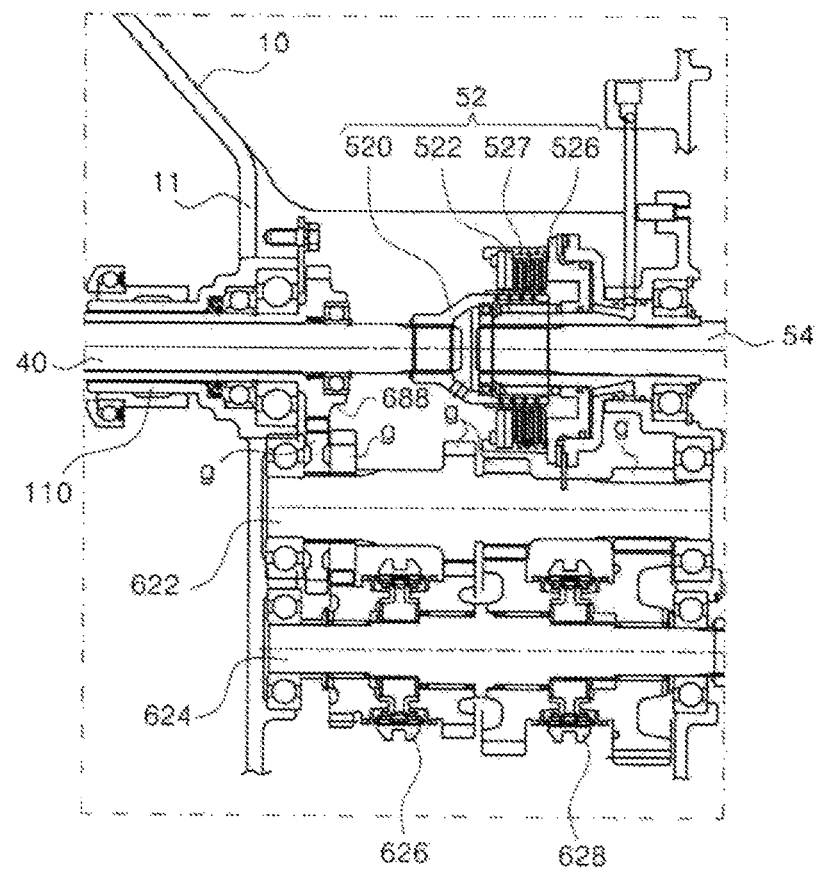
FIG. 4 is an enlarged view showing a PTO clutch unit and a main gear-shifting unit accommodated into a PTO clutch housing of FIG. 3.
Figure 5:
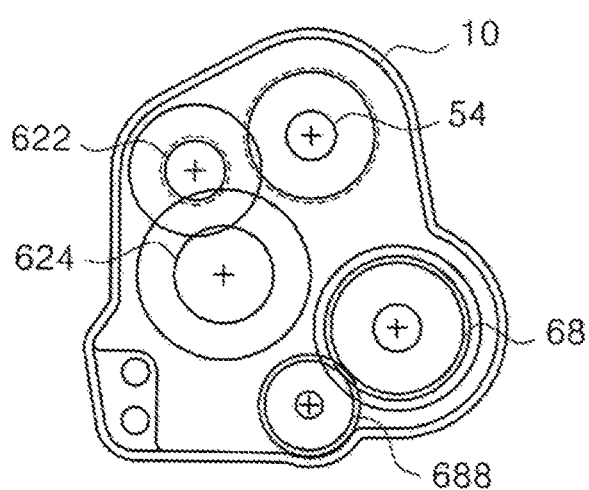
FIG. 5 is a sectional view taken along the line A-A of FIG. 3.

FIG. 4 is an enlarged view showing the PTO clutch unit and the main gear-shifting unit accommodated into the PTO clutch housing of FIG. 3, and FIG. 5 is a sectional view taken along the line A-A of FIG. 3.

Referring to FIGS. 4 and 5, the PTO clutch unit 52 is a hydraulic multi-plate clutch. In more detail, the PTO clutch unit 52 includes a disc boss 520 mounted on the end portion of the input shaft 40, a plate boss 526 mounted on the front end of the PTO shaft 54 in such a manner as to surround the disc boss 520, and a clutch disc 522 and a plate 527 fitted correspondingly to the disc boss 520 and the plate boss 526.

The disc boss 520 is spline-connected to the input shaft 40, and the input shaft 40 is driven by means of a damper plate (whose reference numeral is not indicated herein) of the main clutch 30 assembled to the engine flywheel 20. The plate boss 526, which surrounds the disc boss 520, is spline-connected to the PTO shaft 54, and in the state where the clutch is not operated, the clutch disc 522 and the clutch plate 527 are spaced apart from each other.

If the work vehicle starts, accordingly, the disc boss 520 rotates with the input shaft 40, but the plate boss 526 and the PTO shaft 54 do not rotate. If pressure oil is supplied to a hydraulic chamber (whose reference numeral is not indicated herein) of the plate boss 526 through an oil passage formed on the input shaft 40 or the PTO shaft 54, a piston moves toward a direction pressurizing the clutch plate 527, and thus, the power of the input shaft 40 is transmitted to the PTO shaft 54.

As shown, the main gear-shifting unit 62 has a synchromesh type manual shifting structure. In more detail, the main gear-shifting unit 62 includes a hollow gear shaft 620 fitted to the outer periphery of the input shaft 40 in front of the PTO shaft 54, a main gear-shifting gear shaft 622 engaged with the hollow gear shaft 620 and having gears g with different sizes, and a main gear-shifting output shaft 624 having gears g engaged correspondingly to the gears g of the main gear-shifting gear shaft 622.

Further, the main gear-shifting unit 62 includes main gear-shifting shifters 626 and 628 disposed between the gears g of the main gear-shifting output shaft 624 to select gear-shifting steps, and the main gear-shifting shifters 626 and 628 are connected to main gear-shifting forks connected to a main gear-shifting lever in such a manner as to operate cooperatively therewith. Accordingly, the main gear-shifting lover is manipulated to move the main gear-shifting shifters 626 and 628 in a direction selecting one of the engaged gear pairs, thereby allowing the main gear-shifting gear shaft 622 to be power-transmittably connected to the main gear-shifting output shaft 624.

As shown in FIG. 5, the main gear-shifting gear shaft 622 is disposed in parallel with the side periphery of the PTO shaft 54 in adjacent to the PTO shaft 54 and rotates with the power of the input shaft 40, and the main gear-shifting output shaft 624 is located under the main gear-shifting gear shaft 622 and rotates with the power supplied from the main gear-shifting gear shaft 622. The first gear-shifted power through the main gear-shifting unit 62 is transmitted to the forward/backward gear-shifting unit 64 via the main gear-shifting output shaft 624.

Next, an explanation on the forward/backward gear-shifting unit 64 will be given with reference to FIGS. 6 and 7.

Figure 6:
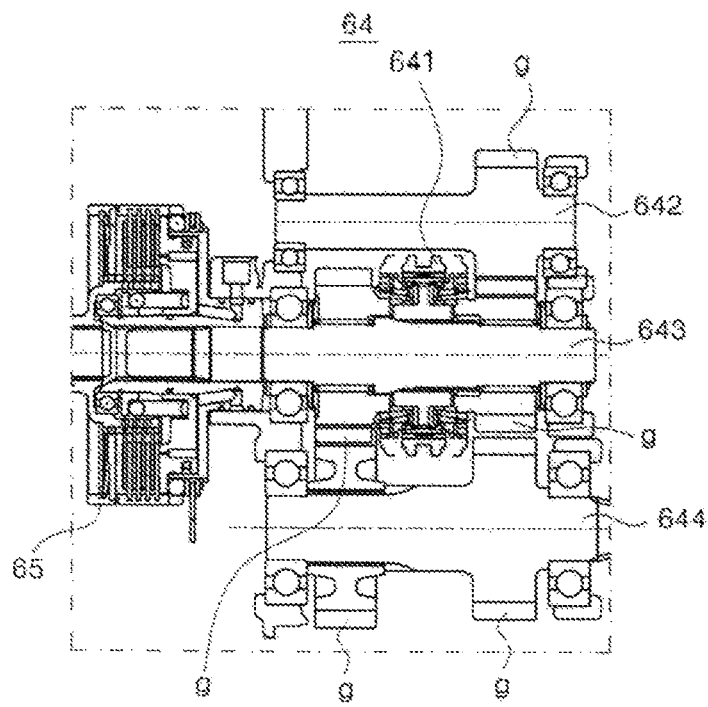
FIG. 6 is an enlarged view showing a forward/backward gear-shifting unit of FIG. 3.
Figure 7:
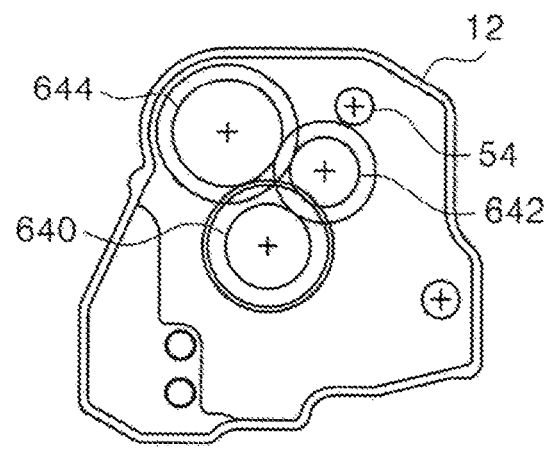
FIG. 7 is a sectional view taken along the line B-B of FIG. 3.

FIG. 6 is an enlarged view showing the forward/backward gear-shifting unit of FIG. 3, and FIG. 7 is a sectional view taken along the line B-B of FIG. 3.

Referring first to FIG. 6, the forward/backward gear-shifting unit 64 is located behind the main gear-shifting unit 62, and a hydraulic multi-plate clutch type intermediate clutch 65 is located between the main gear-shifting unit 62 and the forward/backward gear-shifting unit 64. The intermediate clutch 65 has the same configuration as the PTO clutch unit 52 and disconnects the power between the main gear-shifting unit 62 and the forward/backward gear-shifting unit 64.

If a piston (whose reference numeral is not indicated herein) of the intermediate clutch 65 is at a power off position, the first gear-shifted power through the main gear-shifting unit 62 is not transmitted to the forward/backward gear-shifting unit 64, so that a forward/backward shuttle shaft 640 constituting the forward/backward gear-shifting unit 64 does not rotate, and if the pressure oil is supplied to allow the piston to move in a power on direction, the first gear-shifted power is transmitted to the forward/backward gear-shifting unit 64, thereby driving the forward/backward gear-shifting unit 64.

The forward/backward gear-shifting unit 64 includes the forward/backward shuttle shaft 640 located coaxially with the output side shaft (that is, the main gear-shifting output shaft 624) of the main gear-shifting unit 62, an idle gear shaft 642 located in parallel with the forward/backward shuttle shaft 640, and a forward/backward output shaft 644 located in parallel with the forward/backward shuttle shaft 640 and the idle gear shaft 642 in such a manner as to rotate with the power-transmitted directly from the forward/backward shuttle shaft 640 or with the power bypassing the idle gear shaft 642.

The forward/backward gear-shifting unit 64 also has a synchromesh type manual gear-shifting structure, and in this case, the forward/backward shuttle shaft 640 has a forward/backward shifter 641 spline-connected on a rough center thereof in such a manner as to rotate unitarily therewith. Further, a backward gear g and a forward gear g are freely rotatably fitted to the forward/backward shuttle shaft 640, while interposing the forward/backward shifter 641 therebetween.

A backward driven gear g engaged with the backward gear g and a forward driven gear g engaged with the forward gear g are rotatably fitted unitarily to the forward/backward output shaft 644, and the idle gear shaft 642 has an idle gear g fitted unitarily thereto in such a manner as to allow the forward gear g of the forward/backward shuttle shaft 640 to be power-transmittably connected with the forward driven gear g of the forward/backward output shaft 644.

Under the configuration, if the forward/backward shifter 641 is engaged with the backward gear g through the manipulation of the forward/backward lever, the first gear-shifted power is transmitted directly to the forward/backward output shaft 644 from the backward gear g via the back-ward driven gear g, thereby changing the direction of the rotation, and if the forward/backward shifter 641 moves to the forward gear g, the first gear-shifted power is transmitted to the forward/backward output shaft 644 via the forward driven gear g, while bypassing the idle gear shaft 642, thereby having no change in the direction of the rotation.

As shown in FIG. 7, the components of the forward/backward gear-shifting unit 64 in the transmission case 12 are disposed in such a manner that the forward/backward output shaft 644 is isolately located above the left side periphery of the forward/backward shuttle shaft 640 in parallel with the forward/backward shuttle shaft 640, and the idle gear shaft 642 is located above the right side periphery of the forward/backward shuttle shaft 640 between the forward/backward shuttle shaft 640 and the forward/backward output shaft 644 in parallel with the two shafts.

Figure 8:
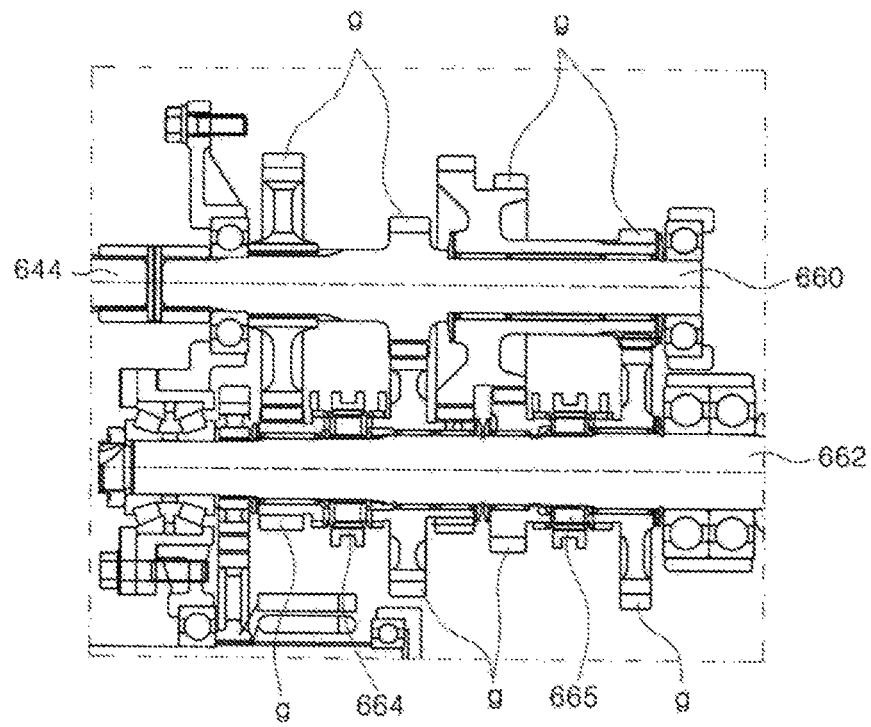
FIG. 8 is an enlarged view showing a sub gear-shifting unit of FIG. 3.
Figure 9:
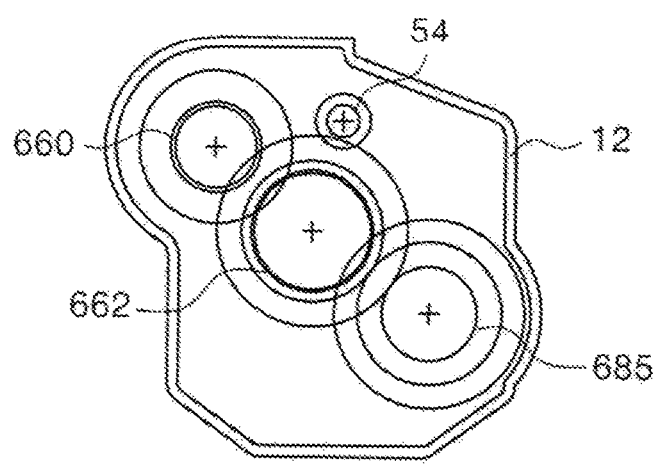
FIG. 9 is a sectional view taken along the line C-C of FIG. 3.

FIG. 8 is an enlarged view showing the sub gear-shifting unit of FIG. 3, and FIG. 9 is a sectional view taken along the line C-C of FIG. 3.

Referring to FIG. 8, the sub gear-shifting unit 66 has a synchromesh type manual gear-shifting structure in the same manner as the main gear-shifting unit 62. In more detail, the sub gear-shifting unit 66 includes a sub gear-shifting gear shaft 660 connected to the output side shaft (the forward/backward output shaft 644) of the forward/backward gear-shifting unit 64 and having a plurality of gears g having different diameters from each other and a pinion shaft 662 having gears g engaged correspondingly to the gears g of the sub gear-shifting gear shaft 660.

The pinion shaft 662 outputs the final gear-shifted power that is gear-shifted by the main gear-shifting unit 62 and the sub gear-shifting unit 66 and determined in the direction of rotation by the forward/backward gear-shifting unit 64 to the rear axle side. Further, sub gear-shifting shifters 664 and 665 are located between the gears g of the pint on shaft 662 so as to select sub gear-shifting steps. Of course, the sub gear-shifting shifters 664 and 665 are link-connected to a sub gear-shifting lever extended fro(r) a driver's seat of the vehicle through sub gear-shifting forks.

Accordingly, the sub gear-shifting lever is manipulated to move one of the sub gear-shifting shifters 664 and 665 in a direction selecting one of the engaged gear pairs, thereby allowing the sub gear-shifting gear shaft 660 to be power-transmittably connected to the pinion shaft 662 and performing the second gear-shifting through which the rotational speed is increased or decreased to the ratio corresponding to the selected gears.

For example, a four-step sub gear-shifting structure wherein total four pairs of gears are located for sub gear-shifting is shown in FIG. 8, but the number of sub gear-shifting steps is not limited thereto.

The components of the sub gear-Shifting unit 66 in the transmission case 12 are located in such a manner that the sub gear-shifting gear shaft 660 is connected directly to the output, side shaft of the forward/backward gear-shifting unit 64 and as shown in FIG. 9, the pinion shaft 662 is located on a rough center of the transmission case 12 under the right side periphery of the sub gear-shifting gear shaft 660 in parallel with the sub gear-shifting gear shaft 660. A reference numeral 685 indicates a transmission shaft adapted to connect the sub gear-shifting unit 66 to the bi-speed turn unit 68 as will be discussed later.

Figure 10:
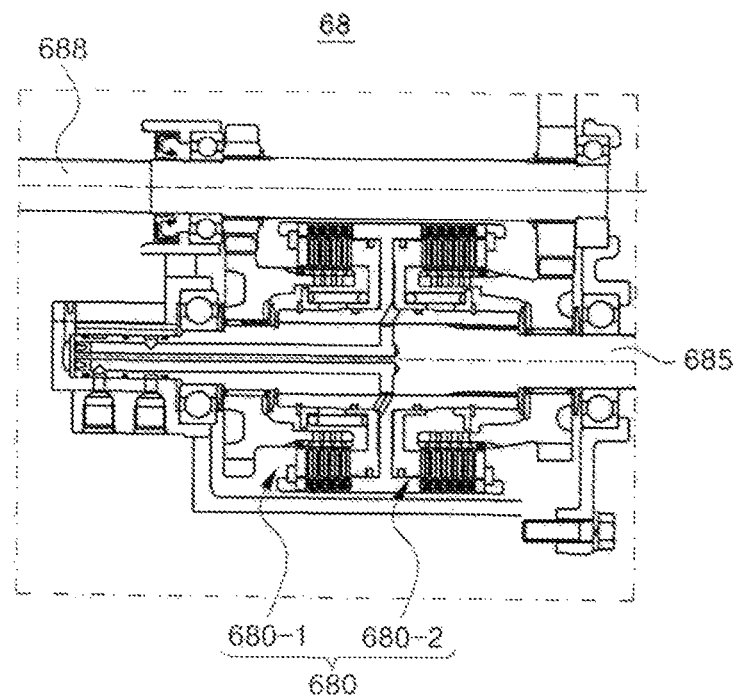
FIG. 10 is an enlarged view showing a bi-speed turn unit of FIG. 3.

FIG. 10 is an enlarged view showing the bi-speed turn unit of FIG. 3.

As shown in FIG. 10, the bi-speed turn unit 68 includes a bi-speed turn clutch 680 having a pair of hydraulic multi-plate front and back clutches 680-1 and 680-2 and the transmission shaft 685 for power-transmittably connecting the bi-speed turn clutch 680 to the output side shaft (the pinion shaft 662) of the sub gear-shifting unit 66 outputting the final gear-shifted power whose rotational speed and direction are determined, so that the power is transmitted to the bi-speed turn clutch 680.

The bi-speed turn clutch 680 has the hydraulic multi-plate clutch 680-1 located on the front side thereof in a longitudinal direction of the transmission case 12, and the hydraulic multi-plate clutch 680-1 is a four wheel drive speed-increasing clutch for bi-speed turn. Further, the bi-speed turn clutch 680 has the hydraulic multi-plate clutch 680-2 located on the rear side thereof in the longitudinal direction of the transmission case 12, and the hydraulic multi-plate clutch 680-2 is a four wheel drive non speed-increasing clutch for transmitting the power not gear-shifted to the front axle. A reference numeral 688 is a front wheel drive shaft for transmitting the gear-shifted power or the power not gear-shifted to the front axle side through the selective connection to the bi-speed turn clutch 680.

Pairs of speed-increasing gears g having different diameters, which are always engaged with each other, are located on the four wheel drive speed-increasing clutch 680-1 and the front wheel drive shaft 688 corresponding to the four wheel drive speed-increasing clutch 680-1, and also, pairs of non speed-increasing gears g having the same diameters, which are always engaged with each other, are located Oh the four wheel drive non speed-increasing clutch 680-2 and the front wheel drive shaft 688 corresponding to the four wheel drive non speed-increasing clutch 680-2.

If four wheel drive (any one of simple four wheel drive mode and four wheel bi-speed turn mode) is selected by the driver, one of the front or back side clutches of the bi-speed turn clutch 680 operates so that the power supplied from the sub gear-shifting unit 66 is transmitted to the front axle side via the speed-increasing gears at the bi-speed revolutions or to the front axle side via the non speed-increasing gears at the revolutions having no additional gear-shifting.

The components of the bi-speed turn unit 68 in the transmission case 12 are located in such a manner that the transmission shaft 685 is located toward the clutch housing 50 along the bottom of the transmission case 12 under the sub gear-shifting unit 56 on the rear side of the transmission case 12 and the bi-speed turn clutch 680 is located adjacently to the right side periphery of the main gear-shifting output shaft 624 of the clutch housing 10, as shown in FIG. 5, so that desirably, they are compactedly located.

Figure 11:
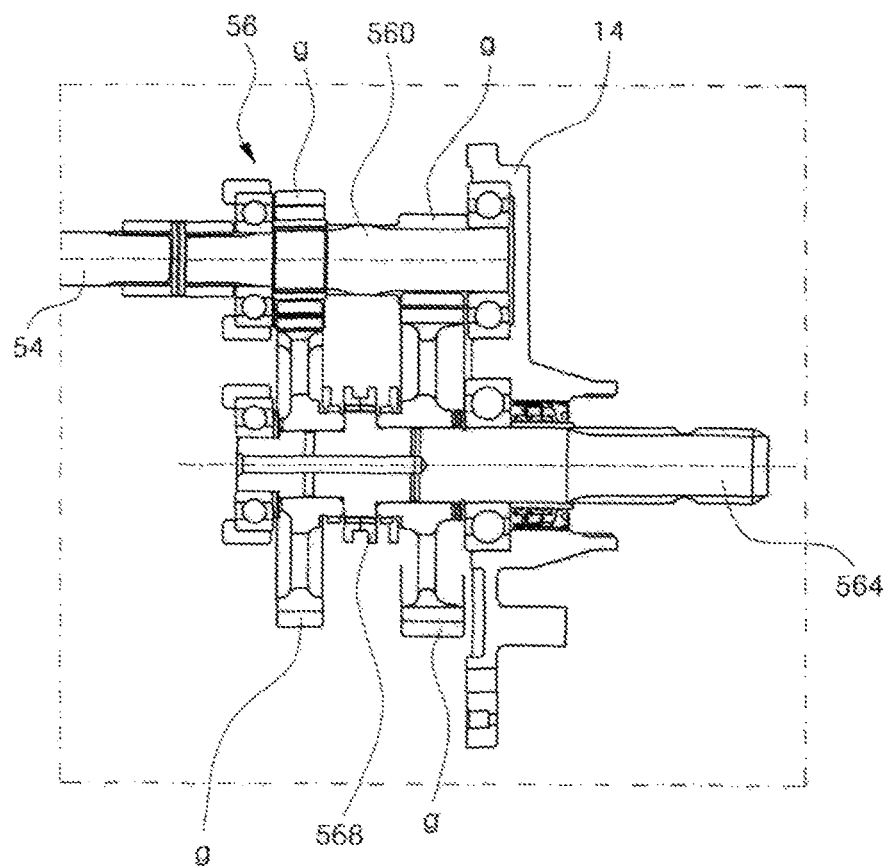
FIG. 11 is an enlarged view showing a PTO reduction unit of FIG. 3.

On the other hand, FIG. 11 is an enlarged view showing the PTO reduction unit of FIG. 3.

As shown in FIG. 11, the PTO reduction unit 56 includes a PTO gear shaft 560 connected directly to the PTO shaft 54 and having two or more gears g having different diameters from each other, a PTO output shaft 564 having two or more gears 9 engaged with the two or sore gears g of the PTO gear shaft 560, and a PTO gear-shifting shifter 568 located between the gears of the pinion shaft 662 to select gear-shifting steps.

The end plats 14, which is disassembledly coupled to the rear end of the transmission case 12, covers the PTO reduction unit 56 on the rear side of the transmission case 12, so that if it is desired to have larger speed decreasing and increasing according to the specifications of the work vehicle, the end plate 14 is demounted and the gears constituting the PTO reduction unit 56 are easily changed according to the specifications of the work vehicle.

As described above, the transmission assembly for an agricultural work vehicle according to the present invention is configured wherein the flywheel housing covering the engine flywheel is formed unitarily with the clutch housing and the spare space in the housings and the case is effectively utilized to allow the respective units to be efficiently located therein, thereby satisfying the demand in the market for a large gear-shifting range and achieving both of miniaturization and compactness of the product.

As the miniaturization and compactness of the product are achieved, additionally, the transmission assembly for an agricultural work vehicle according to the present invention has more advantageous effects than the conventional transmission assemblies in view of the manufacturing cost and assemblability and productivity, and if it is applied to a low-specification small-sized agricultural work vehicle having small wheel sizes, advantageously, it ensures ground clearance and provides a low-floor vehicle with a driver's seat having a low height.

While the present invention has been described with reference to the particular illustrative embodiments, it is not to be restricted by the embodiments but only by the appended claims. It is to he appreciated that those skilled in the art can change or modify the embodiments without departing frost the scope and spirit of the present invention.

| [Explanation on reference humerals] | |
|---|---|
| 12: transmission case | 14: end Plate |
| 20: flywheel | 30: main clutch |
| 40: input shaft | 50: PTO power line |
| 52: PTO clutch unit | 54: PTO shaft |
| 56: PTO reduction unit | 60: driving power line |
| 62: main gear-shifting unit | 64: forward/backward gear-shifting unit |
| 65: intermediate clutch | 66: sub gear-shifting unit |
| 68: bi-speed turn unit | |

The invention claimed is:

1. A transmission assembly for an agricultural work vehicle, comprising:
 a Power Take Off (PTO) power line located coaxially with an input shaft disconnectably connected to an engine flywheel via a main clutch so as to transmit engine power to the outside; and
 a driving power line branched from the input shaft and located biaxially with the PTO power line,
 wherein the PTO power line comprises:
 a PTO shaft located coaxially with the input shaft; and
 a PTO reduction unit which reduces a rotational speed of the PTO shaft to a given speed adequate for working, and
 wherein the driving power line comprises:
 a main gear-shifting unit which performs first gear-shifting of the engine power transmitted from the input shaft;
 a forward/backward gear-shifting unit which performs forward and backward conversion of the first Rear-shifted engine power;
 a sub gear-shifting unit which performs second gear-shifting of the engine power whose rotational direction is determined after the first gear-shifting; and
 a bi-speed turn unit which receives the sub gear-shifted engine power whose rotation direction and speed have been finally determined, and performs front wheel speed-increasing.

2. The transmission assembly for an agricultural work vehicle according to claim 1, further comprising:
 a clutch housing formed unitarily with a flywheel housing adapted to cover the engine flywheel; and
 a hollow transmission case connected directly to the rear side of the clutch housing,
 wherein the clutch housing has, in the interior thereof, a PTO clutch unit for controlling the transmission of the engine power to the PTO shaft, the main gear-shifting unit for performing first gear-shifting of the engine power, and the bi-speed turn unit for performing the bi-speed turn of front wheels, and the transmission case has, in the interior thereof, the forward/backward gear-shifting unit located behind the main gear-shifting unit and the sub gear-shifting unit located behind the forward/backward gear-shifting unit so as to perform the second gear-shifting.

3. The transmission assembly for an agricultural work vehicle according to claim 2, wherein the clutch housing has a partitioning wall formed unitarily therewith in such a manner as to be located between a portion for covering the engine flywheel and a portion for accommodating the main gear-shifting unit thereinto, the partitioning wall being formed unitarily with a hollow input shaft support tube.

4. The transmission assembly for an agricultural work vehicle according to claim 3, wherein the input shaft, which is disconnectably connected to the engine flywheel via the main clutch and at the same time is disconnectably connected to the PTO shaft via the PTO clutch unit, is fitted to the input shaft support tube.

5. The transmission assembly for an agricultural work vehicle according to claim 2, wherein the PTO clutch unit is a hydraulic multi-plate clutch.

6. The transmission assembly for an agricultural work vehicle according to claim 2, wherein the main gear-shifting unit comprises:
 a hollow gear shaft fitted to the outer periphery of the input shaft in front of the PTO shaft;
 a main gear-shifting gear shaft engaged with the hollow gear shaft and having gears with different sizes;
 a main gear-shifting output, shaft having gears engaged correspondingly to the gears of the main gear-shifting gear shaft; and
 main gear-shifting shifters disposed between the gears of the main gear-shifting output shaft to select gear-shifting steps.

7. The transmission assembly for an agricultural work vehicle according to claim 6, wherein the main gear-shifting gear shaft is disposed in parallel with the side periphery of the PTO shaft, and the main gear-shifting output shaft is located under the main gear-shifting gear shaft.

8. The transmission assembly for an agricultural work vehicle according to claim 2, further comprising a hydraulic multi-plate clutch type intermediate clutch located between the main gear-shifting unit and the forward/backward gear-shifting unit.

9. The transmission assembly for an agricultural work vehicle according to claim 2, wherein the forward/backward gear-shifting unit comprises:
 a forward/backward shuttle shaft located coaxially with the output side shaft of the main gear-shifting unit;
 an idle gear shaft located in parallel with the forward/backward shuttle shaft; and
 a forward/backward output shaft located in parallel with the forward/backward shuttle shaft and the idle gear shaft in such a manner as to rotate with the power transmitted directly from the forward/backward shuttle shaft or with the power bypassing the idle gear shaft.

10. The transmission assembly for an agricultural work vehicle according to claim 9, wherein the forward/backward shuttle shaft has a forward gear, a backward gear, and a forward/backward shifter moving between the forward gear and the backward gear fitted thereto, the forward/backward output shaft has a backward driven gear engaged with the backward gear and a forward driven gear engaged with the forward gear fitted thereto, and the idle gear shaft has an idle gear fitted unitarily thereto to power-transmittably connect the forward gear with the forward driven gear.

11. The transmission assembly for an agricultural work vehicle according to claim 9, wherein the forward/backward output shaft is isolatedly located on the side periphery of the forward/backward shuttle shaft in parallel with the forward/backward shuttle shaft, and the idle gear shaft is located above the right side periphery of the forward/backward shuttle shaft between the forward/backward shuttle shaft and the forward/backward output shaft in parallel with the two shafts.

12. The transmission assembly for an agricultural work vehicle according to claim 2, wherein the sub gear-shifting unit comprises:
   a sub gear-shifting gear shaft connected to the output side shaft of the forward/backward gear-shifting unit and having a plurality of gears having different diameters from each other;
   a pinion shaft having gears engaged correspondingly to the gears of the sub gear-shifting gear shaft to output the final gear-shifted power whose rotational speed and direction are determined to a rear axle side; and
   sub gear-shifting shifters located between the gears of the pinion shaft so as to select sub gear-shifting steps.

13. The transmission assembly for an agricultural work vehicle according to claim 12, wherein the sub gear-shifting gear shaft is located on the same line as the output side shaft of the forward/backward gear-shifting unit, and the pinion shaft is located on the center of the transmission case on the side periphery of the sub gear-shifting gear shaft in parallel with the sub gear-shifting gear shaft.

14. The transmission assembly for an agricultural work vehicle according to claim 2, wherein the bi-speed turn unit comprises:
   a bi-speed turn clutch having a pair of front and back hydraulic multi-plate clutches;
   a transmission shaft for power-transmittably connecting the bi-speed turn clutch to the output side shaft of the sub gear-shifting unit outputting the final gear-shifted power whose rotational speed and direction are determined; and
   a front wheel drive shaft for transmitting, the gear-shifted power or the power not gear-shifted, which is determined through the selective connection to the bi-speed turn clutch, to a front axle.

15. The transmission assembly for an agricultural work vehicle according to claim 14, wherein the transmission shaft is extended toward the clutch housing along the bottom of the transmission case under the sub gear-shifting unit on the rear side of the transmission case, and the bi-speed turn clutch is located in the spare space under the main gear-shifting unit of the clutch housing.

16. The transmission assembly for an agricultural work vehicle according to claim 2, farther comprising:
   a PTO reduction unit located on the rear end periphery of the PTO shaft; and
   an end plate located on the rear end of the transmission case to cover the PTO reduction unit.

17. The transmission assembly for an agricultural work vehicle according to claim 16, wherein the PTO reduction unit comprises:
   a PTO gear shaft connected directly to the PTO shaft and having two or more gears having different diameters from each other;
   a PTO output shaft having two or more gears engaged with the two or more gears of the PTO gear shaft; and
   a PTO gear-shifting shifter located between the gears of the pinion shaft to select gear-shifting steps.

18. The transmission assembly for an agricultural work vehicle according to claim 8, wherein the forward/backward gear-shifting unit comprises:
   a forward/backward shuttle shaft located coaxially with the output side shaft of the main gear-shifting unit;
   an idle gear shaft located in parallel with the forward/backward shuttle shaft; and
   a forward/backward output shaft located in parallel with the forward/backward shuttle shaft and the idle gear shaft in such a manner as to rotate with the power transmitted directly from the forward/backward shuttle shaft or with the power bypassing the idle gear shaft.

19. The transmission assembly for an agricultural work vehicle according to claim 18, wherein the forward/backward shuttle shaft has a forward gear, a backward gear, and a forward/backward shifter moving between the forward gear and the backward gear fitted thereto, the forward/backward output shaft has a backward driven gear engaged with the backward gear and a forward driven gear engaged with the forward gear fitted thereto, and the idle gear shaft has an idle gear fitted unitarily thereto to power-transmittably connect the forward gear with the forward driven gear.

20. The transmission assembly for an agricultural work vehicle according to claim 18, wherein the forward/backward output shaft is isolatedly located on the side periphery of the forward/backward shuttle shaft in parallel with the forward/backward shuttle shaft, and the idle gear shaft is located above the right side periphery of the forward/backward shuttle shaft between the forward/backward shuttle shaft and the forward/backward output shaft in parallel with the two shafts.

* * * * *